(12) United States Patent
Juels et al.

(10) Patent No.: US 8,782,752 B1
(45) Date of Patent: Jul. 15, 2014

(54) APPARATUS AND METHOD FOR MULTI-PLANE THRESHOLD SECURITY

(75) Inventors: Ari Juels, Brookline, MA (US); Nirav Mehta, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 137 days.

(21) Appl. No.: 13/538,567

(22) Filed: Jun. 29, 2012

(51) Int. Cl.
*H04L 29/06* (2006.01)

(52) U.S. Cl.
USPC .......... 726/4; 726/2; 726/14; 726/17; 726/21; 726/22; 726/23; 726/24; 726/25; 726/26; 705/51; 705/52; 370/235

(58) Field of Classification Search
CPC ..................... H04L 12/2461; H04L 12/40104; H04L 41/28; H04L 63/00; H04L 63/105; H04L 63/16; H04L 63/20; H04L 9/085; H04L 12/2692; H04L 43/16; H04N 21/4627; H04N 21/4753; H04N 21/6334; H04N 21/63345; G06F 12/14; G06F 19/32; G06F 21/00; G06F 21/805; G06F 1/00; G06F 11/1004

USPC .............. 726/2, 4, 14, 17, 21–26; 705/51–52; 370/235
See application file for complete search history.

(56) References Cited

U.S. PATENT DOCUMENTS 7,234,168 B2 \* 6/2007 Gupta et al. .................... 726/25
8,339,959 B1 \* 12/2012 Moisand et al. ............... 370/235

\* cited by examiner

*Primary Examiner* — Thanhnga B Truong
(74) *Attorney, Agent, or Firm* — Ryan, Mason & Lewis, LLP

(57) ABSTRACT

Servers are configured to operate in two or more threshold security planes with each such threshold security plane implementing at least a portion of a corresponding threshold security protocol involving at least a subset of the servers. The servers are implemented on at least one processing device comprising a processor coupled to a memory. Multiple ones of the servers may be implemented on a single processing device, or each of the servers may be implemented on a separate processing device. At least one of the servers may be part of at least two of the threshold security planes. A given request for a protected resource is processed through each of the planes in order for a corresponding user to obtain access to the protected resource. By way of example, the security planes may comprise two or more of an authentication plane, an access control plane and a resource plane.

22 Claims, 3 Drawing Sheets

APPARATUS AND METHOD FOR MULTI-PLANE THRESHOLD SECURITY

FIELD

The field relates generally to information security, and more particularly to techniques for providing secure access to protected resources.

BACKGROUND

Numerous techniques are known for providing secure access to protected resources. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Although two-factor authentication based on token passcodes can provide adequate security in many applications, a need remains for further improvements. For example, even in strongly-defended systems, security breaches are becoming more common due to the increasing sophistication of advanced persistent threats (APTs). APTs are usually mounted by well-funded attackers with very specific targets.

SUMMARY

One or more illustrative embodiments of the present invention provide multi-plane threshold security techniques that can better protect sensitive resources than conventional authentication approaches, particularly in the presence of APTs.

In one embodiment, servers are configured to operate in two or more threshold security planes with each such threshold security plane implementing at least a portion of a corresponding threshold security protocol involving at least a subset of the servers. The servers are implemented on at least one processing device comprising a processor coupled to a memory. Multiple ones of the servers may be implemented on a single processing device, or each of the servers may be implemented on a separate processing device. At least one of the servers may be part of at least two of the threshold security planes.

The servers configured to provide multi-plane threshold security may be utilized to protect sensitive resources, such as files or other data, keys, control mechanisms or other types of resources. In such arrangements, a given request for a particular protected resource is processed through each of the planes in order for the corresponding user to obtain access to the protected resource.

One or more of the multiple threshold security planes may each comprise n servers and may implement at least a portion of an (n,k)-threshold security protocol in which assent from a minimum number k of the n servers is required in order for a request for a protected resource to pass the (n,k)-threshold security protocol, where k≤n.

By way of example, the two or more security planes may comprise two or more of an authentication plane, an access control plane and a resource plane.

The illustrative embodiments advantageously overcome the drawbacks of conventional techniques, by providing a flexible architecture for implementing multi-plane threshold security protection for sensitive resources in a wide variety of different applications. The multi-plane threshold security can serve as an effective deterrent to APTs.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "server" as used herein is intended to be construed broadly, so as encompass not only network-based servers but also numerous other types of devices that can be arranged with one or more other devices to form multiple threshold security planes in the manner disclosed herein. A given such server therefore need not be a network-based server, and may be implemented as a portion of a device that performs other functions, as a combination of a plurality of devices, or in other forms.

As will be described, the present invention in one or more illustrative embodiments provides secure access to sensitive resources through what are referred to herein as multi-plane threshold security arrangements.

Figure 1:
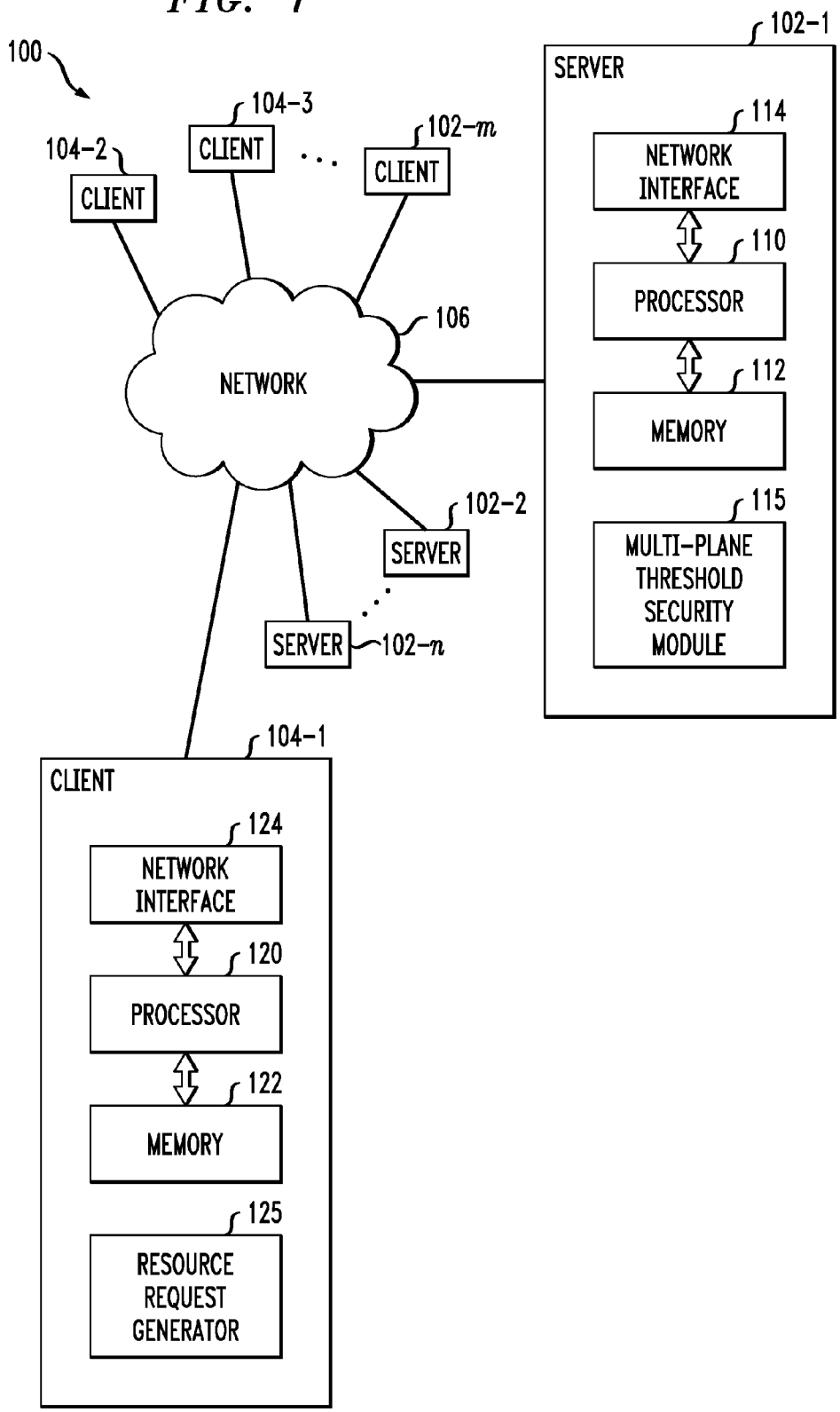
FIG. 1 is a block diagram of a communication system with multi-plane threshold security functionality in an illustrative embodiment of the invention.

FIG. 1 shows a communication system 100 that incorporates multi-plane threshold security functionality in an illustrative embodiment. The system 100 comprises a plurality of servers 102-1, 102-2, . . . 102-*n* that are configured to communicate with a plurality of clients 104-1, 104-2, . . . 104-*m*, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100. It is also possible that multiple servers 102 can be implemented on a single processing device, that multiple clients 104 may be implemented on a single processing device, or that at least one server and at least one client can be implemented on the same processing device.

The system 100 in the present embodiment implements one or more processes for multi-plane threshold security in order to control user access to protected resources. An example of such a process performed using a particular arrangement of servers into a plurality of threshold security planes will be described in conjunction with FIG. 2, but it is to be appreciated that numerous other types of multi-plane threshold security processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes a multi-plane threshold security module 115 that allows the server 102-1 to collaborate with other ones of the servers 102 to form multiple threshold security planes in controlling user access to protected resources. This module may be implemented at least in part in the form of software that is stored in memory 112 and executed by processor 110.

The other servers 102 of the system 100 are assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers.

The client 104-1 further includes a resource request generator 125. The resource request generator 125 is generally configured to generate a request for a resource protected by the servers 102, responsive to user input. This module may be implemented at least in part in the form of software that is stored in memory 122 and executed by processor 120.

The other clients 104 of the system 100 are assumed to be configured in a manner similar to that shown for client 104-1 in the figure.

Each of the clients 104 may be associated with a different user, or multiple clients may be associated with a single user. The term "user" as utilized herein is intended to be broadly construed so as to encompass, for example, a human user associated with a given client, an automated user such as an application or other hardware or software component associated with a given client, or any other entity that may trigger generation of a request for a protected resource in system 100 through one of the clients 104.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured such that the servers 102 form multiple threshold security planes, with each such threshold security plane implementing at least a portion of a corresponding threshold security protocol involving at least a subset of the servers 102. The planes are configured to control user access to protected resources, such as files or other data stored on one or more of the servers or associated processing devices. In the embodiment to be described in conjunction with FIG. 2, the planes are arranged such that a request for a protected resource must pass through all of the planes in order for a corresponding user to obtain access to the protected resource. At least one of the servers 102 may be part of at least two of the threshold security planes.

Embodiments of the present invention are not limited in terms of the type of protected resources for which security is provided using the multi-plane threshold security. Other examples of protected resources may include key shares, or physical devices and applications, in addition to or in place of the above-noted files or other data. A protected resource may additionally or alternatively comprise a permission to modify a particular setting in a physical control system or other type of system.

The user request for access to a protected resource may be processed sequentially by the various planes, such that the request must first pass through an initial one of the planes before reaching the next plane in a sequence of planes. Alternatively, processing associated with one plane may be performed at least in part in parallel with processing associated with another one of the planes.

As a more particular example, a given one of the planes in a multi-plane threshold security arrangement may comprise all n of the servers 102. The given plane in this arrangement may implement at least a portion of an (n,k)-threshold security protocol in which assent from a minimum number k of the n servers, where k≤n, is required in order for a request for a protected resource to pass the threshold security protocol. The decision by each server of a given plane may be provided in the form of a simple accept or reject message, with the accept message indicating assent by that server to the particular resource request being processed by the given plane.

The other planes of the multi-plane arrangement may each include different numbers of servers, or each may include all n of the servers. A more detailed example will be described below in conjunction with FIG. 2, in which the servers implement a total of three threshold security planes, and more particularly, an authentication plane, an access control plane and a resource plane.

Although described primarily in the context of user access to a protected resource, a multi-plane security arrangement of the type disclosed herein can be utilized for other security functions, such as authentication decisions.

It is to be appreciated that the particular set of elements shown in FIG. 1 for providing multi-plane threshold security functionality is presented by way of example, and in other embodiments additional or alternative elements may be used. Thus, another embodiment may include additional networks and additional sets of clients or servers, or other types and arrangements of processing devices.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices. Examples of such processing platforms will be described below in conjunction with FIGS. 3 and 4.

Figure 2:
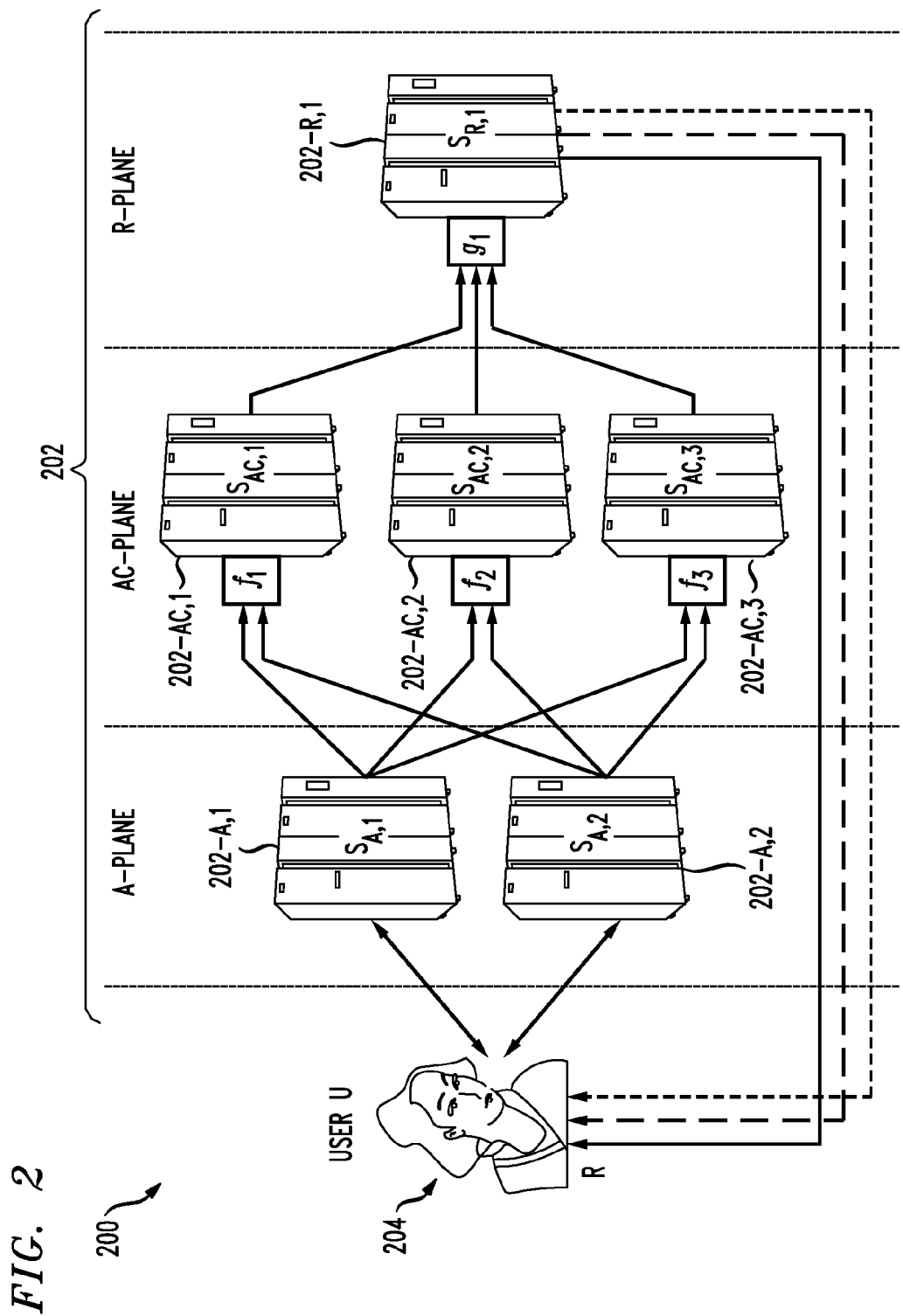
FIG. 2 shows one possible implementation of the FIG. 1 system including a plurality of servers configured in three distinct threshold security planes.

FIG. 2 shows an example of a communication system 200 corresponding generally to an implementation of communication system 100 in which a plurality of servers 202 form three distinct threshold security planes, namely, an authentication plane denoted A-plane, an access control plane denoted AC-plane, and a resource plane denoted R-plane. Each of the servers 202 is assumed to be configured to include a processor, memory, network interface and multi-plane threshold security module, in a manner similar to that described above in the context of server 102-1. The servers 202 collaborate with one another in forming the multiple threshold security planes that are used to process a given request received from a user 204 for access to a protected resource. The user 204 is assumed to be human user associated with a corresponding client that communicates with the servers 202 over one or more networks, but as indicated previously the user in other embodiments may comprise an automated hardware or software component or other system entity.

Each of the threshold security planes implements at least a portion of a separate threshold security protocol using multiple ones of the servers 202. More particularly, the A-plane comprises two servers 202-A,1 and 202-A,2 which are also respectively denoted as $S_{A,1}$ and $S_{A,2}$. The AC-plane comprises three servers 202-AC,1, 202-AC,2 and 202-AC,3 which are also respectively denoted as $S_{AC,1}$, $S_{AC,2}$ and $S_{AC,3}$. The R-plane comprises a single server 202-R,1, which is also denoted as $S_{R,1}$. The three planes each provide distinct security functionality in the present embodiment, as will be described in more detail below. As mentioned previously, it may be assumed that distinct servers are used in each plane, such that each of the servers 202 shown in FIG. 2 represents a separate server. Alternatively, one or more of the servers 202 may each operate in multiple planes in the FIG. 2 embodiment. Thus, for example, server $S_{A,1}$ may be the same server as server $S_{R,1}$.

It may be further assumed that there are secure communication channels between the servers 202, such as authenticated channels with basic security features of integrity, freshness and confidentiality. Similar secure communication channels may be assumed to exist between the user 204 and its associated client device and the servers 202. A given such user-to-server channel may be configured, for example, to authenticate the servers, but not necessarily the user. The secure channels may be created using conventional protocols such as Transport Layer Security (TLS) or Secure Sockets Layer (SSL).

In the FIG. 2 embodiment, each server in the A-plane is configured to verify the correctness of an asserted identity, role or security posture of user 204, and implicitly or explicitly issues an attestation to its authentication decision. For example, the set of servers of the A-plane can implement a threshold security protocol based on one or more of password-based authentication, challenge-response against a user-presented certificate, biometric authentication using trusted client-side hardware, as well as combinations of these and other authentication methods.

The attestation from a given A-plane server may be in the form of a simple accept or reject indication. More complex attestations such as scores may alternatively be used. The attestation may be authenticated for a given user session s, through use of a digital signature or other authentication technique. An attestation for a user session s as emitted by server $S_{A,i}$ is denoted herein as $A[s, S_{A,i}]$, where $i=\{1, 2\}$ in the present embodiment. The session identifier s may be a unique, random session identifier.

Each server in the AC-plane receives the set of attestations $\{A[s, S_{A,i}]\}$ from the servers in the A-plane. A given one of the AC-plane servers determines access rights for the user in session s to a given protected resource $\rho$, according to a potentially server-specific access control policy denoted $f_j$. Thus, each of the servers in the AC-plane may implement a different access control policy as part of the threshold security protocol provided by that plane. Each AC-plane server $S_{AC,j}$ issues an associated credential $AC[s, S_{AC,j}, \rho]$, where $j=\{1, 2, 3\}$ in the present embodiment.

The server in the R-plane receives the set of credentials $\{AC[s, S_{AC,j}, \rho]\}$ from the servers in the AC-plane. It releases protected resource $\rho$ as determined by the user request and the associated credentials according to a potentially server-specific resource-release policy $g_l$, where $l=\{1\}$ in the present embodiment. The protected resource may be provided back to user 204 via the solid feedback line labeled R in the figure. The sets of attestations and credentials from the respective A-plane and AC-plane may also flow from server 202-R,1 back to the user 204 as indicated by the dashed feedback lines.

In the FIG. 2 embodiment, thresholding is applied by the functions $f_j$ and $g_l$ in the respective AC-plane and R-plane. Thus, in accordance with a given threshold security protocol, a thresholding portion of the protocol may be applied in one plane using attestations, credentials or other information received from another plane that implements another portion of the protocol. The servers of a given plane generating such information therefore need not make a thresholding determination based on that information, although these servers nonetheless are said to implement at least a portion of the threshold security protocol.

The term "threshold security plane" as used herein is therefore intended to be broadly construed, so as to encompass, for example, a plane that generates information suitable for use in thresholding, even where the actual thresholding determination is made outside of that plane. In other embodiments, thresholding may be applied in the same plane in which such information is generated, possibly utilizing a thresholding element similar to one of the functions $f_j$ and $g_l$ but implemented in that same plane. Such a plane is also considered an example of a "threshold security plane" as that term is utilized herein, and may be said to implement a threshold security protocol in its entirety.

Accordingly, the particular arrangement shown in FIG. 2 is presented by way of example only, and numerous other variants are possible. Thus, for instance, the values of i, j and/may be varied in other embodiments, as well as the type of attestations and credentials passed between the planes. The number and type of planes as well as their associated threshold security protocols may also be varied in other embodiments.

In another variant, a given server in the A-plane or AC-plane may communicate respective attestations or credentials downstream to only a subset of servers in the receiving plane. As one example of an alternative configuration of this type, all three planes of the FIG. 2 embodiment may be implemented on just two distinct processing devices, denoted Blue and Red, with an A-plane server on the Blue or Red device passing attestations only to an AC-plane server implemented on that same device, and an AC-plane server on the Blue or Red device passing credentials only to an R-plane server implemented on that same device. Additionally, when passed locally among servers implemented on the same device, attestations and credentials may be transmitted without using digital signatures or other authentication techniques otherwise associated with secure communication channels.

Another example of a three-plane embodiment will now be described. In this embodiment, the protected resource comprises sensitive archived files that are to be released only to authorized users. Each plane comprises two servers $S_1$ and $S_2$, and each plane implements a (2,2)-threshold protocol, such that both servers of each plane must assent in order for the user to obtain access to a requested file.

Upon storage, a file F with handle h is encrypted as $C.h = E_{k.h}[F.h]$ under a file-specific key k.h. This key is distributed in a (2,2)-threshold manner between servers in the R-plane, such that a first share $k_1.h$ is stored on $S_1$ and a second share $k_2.h$ is stored on $S_2$. The encrypted file C.h may be stored directly on one or both of the servers in the R-plane or in a corresponding publicly-accessible repository or other file storage system. In the latter case, the R-plane manages file-encryption keys, and may be viewed, along with the corresponding file storage system, as part of a larger plane.

To obtain file F, a user U first authenticates to the A-plane, for example, using a certificate, in conjunction with a resource request directed to file F (e.g., "read F"). The servers of the A-plane jointly authenticate the user (e.g., in a challenge-response manner) and collectively issue a joint authentication decision to the AC-plane for identity U and session identifier s.

In the AC-plane, the servers determine whether user U is entitled to the requested file F. If the servers determine that user U is so entitled, each server issues a corresponding credential indicating that user U is entitled to read file F in session s. These credentials are passed on to the R-plane.

On receiving valid credentials for the user request, servers $S_1$ and $S_2$ of the R-plane release respective keys $k_1.h$ and $k_2.h$ to user U in session s. The user U additionally receives the ciphertext C.h of requested file F. In order to ensure direct release to the user and not to other planes, the R-plane may establish a secure channel directly with U. However, in this example, a separate channel offers no significant extra utility, in that all planes are implemented using the same pair of servers. The user combines the two key shares to obtain k.h and decrypt C.h, thereby obtaining F.h as desired.

It should be noted that the above embodiment may be configured to support alternative key hierarchies. For example, a key-encrypting key (KEK) k might be protected using the multi-plane thresholding, while an encryption of k.h under k is stored with the file F.

Also, U may authenticate to the A-plane not by asserting its identity, but through a proof of its security posture. For example, a server containing a trusted hardware module may generate an anonymous attestation that it is executing a given software stack X. The servers $S_1$ and $S_2$ may then authenticate the software stack in the A-plane, while the AC-plane determines whether a particular entity executing stack X should be permitted to access the decryption keys for file F.

One or more of the planes may be configured so as to utilize conventional cryptographic processes. Examples of such processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include other numbers, types and arrangements of users, servers, threshold security planes, and possibly other system components. Also, as indicated previously, other embodiments may combine certain system elements, such as multiple servers into a single processing device. It is also possible to eliminate, modify or replace other system elements. For example, at least one of the planes may be eliminated in other embodiments.

The particular processing operations and other system functionality described in conjunction with the diagram of FIG. 2 are presented by way of illustrative example only, and should not be construed as limiting the scope of the invention in any way. Alternative embodiments can use other types of processing operations for multi-plane threshold security. For example, the number and types of threshold security planes may be varied in other embodiments, as well as the number of servers utilized in each plane, and the particular portions of the associated threshold security protocols that are performed in each plane.

Also, score-based authentication may be used. For example, an A-plane server may output not a simple accept or reject authentication decision for user U, but instead may issue a more general assessment of user identity or security posture. As a more particular example of a score-based authentication approach implemented in the A-plane, servers participating in an authentication decision might output probabilities in the range [0,1] characterizing confidence in multiple user-presented authentication factors. In this case, a policy $f_j$ may take the confidence scores as input to its access control decision.

It is also possible for the A-plane in a given embodiment to perform substantially continuous authentication of the identity or security posture of U in support of an ongoing request for protected resource $\rho$. Thus, the system as a whole may adjust permissions on a dynamic basis.

The servers forming a given one of the planes may implement proactivation or reconfiguration techniques. For example, servers in a given plane may, over time, refresh shared secrets. They may also integrate new servers into the plane or remove currently participating servers from the plane.

In other embodiments, the servers of the R-plane may contain shared data instead of shared keys. For example, a database may be stored in split form over the R-plane servers. These servers can then use techniques such as secure multi-party computation or homomorphic cryptography to perform operations on the database.

As indicated above, other embodiments of the invention may include more or fewer than three planes. Also, it is possible that only a subset of the available planes may be utilized for particular types of operations. As an example of an embodiment with selective plane use of this type, the A-plane may be used for password-based authentication in some resource request contexts, without requiring use of the AC-plane and R-plane, while all three planes are utilized in other resource request contexts.

It is to be appreciated that multi-plane threshold security functionality such as that described in conjunction with the diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments provide a flexible architecture for implementing multi-plane threshold security protection for sensitive resources. As a result, such arrangements can serve as highly effective deterrents to APTs and other security attacks.

Figure 3:
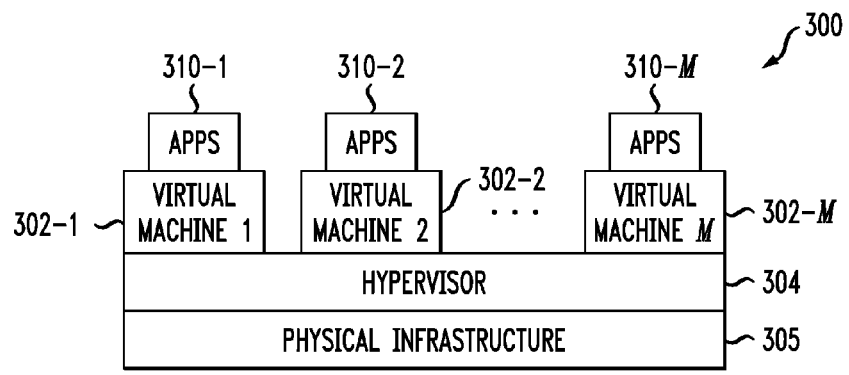
FIGS. 3 and 4 show examples of processing platforms that may be utilized to implement at least a portion of the FIG. 1 system.

Referring now to FIG. 3, portions of the communication system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system. Thus, for example, the servers 102 and the clients 104 of the communication system 100 may each be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of communication system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
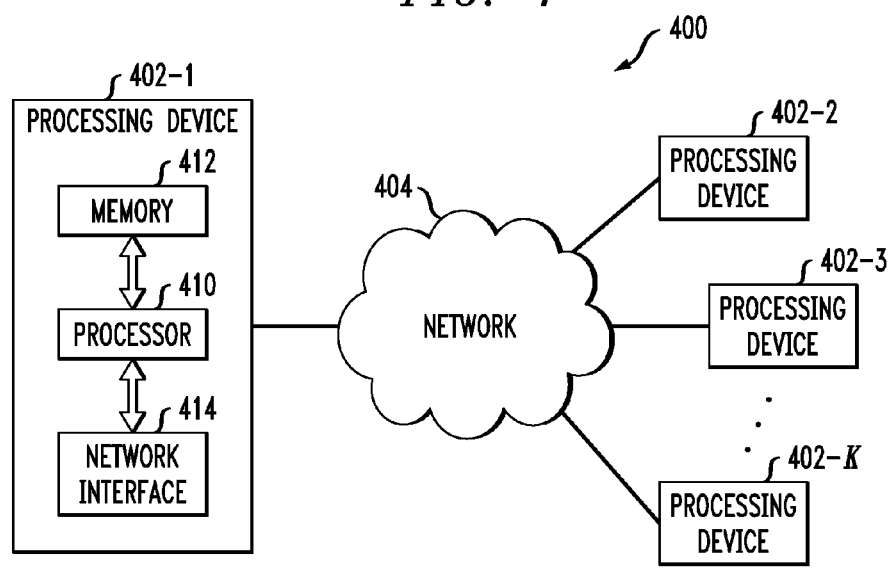

Multiple elements of communication system 100 may be collectively implemented on a common processing platform of the type shown in FIG. 3 or 4, or each such element may be implemented on a separate processing platform.

Also, as mentioned previously, the servers 102 may be mapped to processing devices such as processing devices 402 in a variety of different manners. For example, multiple ones of the servers may be implemented on a single processing device, or each of the servers may be implemented on a separate processing device.

It should again be emphasized that the above-described embodiments of the invention are presented for purposes of illustration only. Many variations and other alternative embodiments may be used. For example, the techniques are applicable to a wide variety of other types of systems and processing devices that can benefit from the enhanced resource protections provided by multi-plane threshold security of the type disclosed herein. Also, the particular configurations of elements shown in FIGS. 1, 3 and 4, and the multi-plane threshold security process shown in FIG. 2, can be varied in other embodiments. For example, parameters such as the number of planes used and the number of servers per plane can be varied in other embodiments. These and numerous other alternative embodiments within the scope of the appended claims will be readily apparent to those skilled in the art.

What is claimed is:

1. An apparatus comprising:
 a plurality of servers configured to operate in two or more threshold security planes with each such threshold security plane implementing at least a portion of a corresponding threshold security protocol involving at least a subset of the servers;
 wherein a given one of the planes comprises n servers and implements at least a portion of an (n,k)-threshold security protocol in which assent from a minimum number k of the n servers is required in order for a request for a protected resource to pass the (n,k)-threshold security protocol, where k≤n; and
 wherein the servers are implemented on at least one processing device comprising a processor coupled to a memory.

2. The apparatus of claim 1 wherein multiple ones of the servers are implemented on a single processing device.

3. The apparatus of claim 1 wherein each of the servers is implemented on a separate processing device.

4. The apparatus of claim 1 wherein at least one of the servers is part of at least two of the threshold security planes.

5. The apparatus of claim 1 wherein a given request for a protected resource must pass through each of the planes in order for a corresponding user to obtain access to the protected resource.

6. The apparatus of claim 1 wherein the two or more security planes comprise two or more of an authentication plane, an access control plane and a resource plane.

7. The apparatus of claim 6 wherein at least one server $S_{A,i}$ of the authentication plane applies at least one authentication protocol to determine if a requesting user is authenticated and if the requesting user is authenticated generates an attestation for a user session as $A[s, S_{A,i}]$, where i is an integer identifying a particular one of the authentication plane servers, and s is an identifier of the user session.

8. The apparatus of claim 7 wherein at least one server $S_{AC,j}$ of the access control plane receives a set of attestations $\{A[s, S_{A,i}]\}$ from the servers $S_{A,i}$ of the authentication plane and processes the set of attestations to determine if a credential should be issued, and if a credential should be issued, that server issues a credential $AC[s, S_{AC,j}, \rho]$, where j is an integer identifying a particular one of the access control plane servers and where $\rho$ denotes a given protected resource.

9. The apparatus of claim 8 wherein at least one server $S_{R,l}$ of the resource plane receives a set of credentials $\{AC[s, S_{AC,j}, \rho]\}$ from the servers $S_{AC,j}$ of the access control plane and processes the set of credentials to determine if a protected resource should be released to the user, and if the protected resource should be released to the user, that server generates an indication that the protected resource should be released to the user.

10. The apparatus of claim 7 wherein the user session identifier s comprises a unique, random session identifier.

11. The apparatus of claim 8 wherein a given one of the servers $S_{AC,j}$ of the access control plane determines access rights for the user in session s to a given protected resource $\rho$ based on the received attestations, in accordance with an access control policy $f_j$.

12. The apparatus of claim 9 wherein a given one of the servers $S_{R,l}$ of the resource plane determines if protected resource $\rho$ should be released to the user in session s based on the received credentials, in accordance with a resource release policy $g_l$.

13. The apparatus of claim 6 wherein servers of the resource plane each store respective shares of a key required for access to a protected resource.

14. The apparatus of claim 6 wherein servers of the resource plane each store different portions of a protected resource.

15. A communication system comprising the apparatus of claim 1.

16. A method comprising the steps of:
 configuring a plurality of servers to operate in two or more threshold security planes; and
 implementing in each of the threshold security planes at least a portion of a corresponding threshold security protocol involving at least a subset of the servers;
 wherein a given one of the planes comprises n servers and implements at least a portion of an (n,k)-threshold security protocol in which assent from a minimum number k of the n servers is required in order for a request for a protected resource to pass the (n,k)-threshold security protocol, where k≤n; and
 wherein the steps are performed by at least one processing device comprising a processor coupled to a memory.

17. The method of claim 16 wherein the configuring step comprises configuring the threshold security planes such that a given request for a protected resource must pass through each of the planes in order for a corresponding user to obtain access to the protected resource.

18. The method of claim 16 wherein the configuring step comprises configuring the servers to operate in two or more of an authentication plane, an access control plane and a resource plane.

19. A computer program product comprising a processor-readable storage medium having embodied therein one or more software programs, wherein the one or more software programs when executed by said at least one processing device cause the steps of the method of claim 16 to be performed.

20. The apparatus of claim 1 wherein the two or more threshold security planes comprise an authentication plane, an access control plane and a resource plane.

21. The apparatus of claim 20, wherein assent from two or more servers in each of the planes is required in order for a request for a protected resource to pass the corresponding threshold security protocol.

22. An apparatus comprising:
 a plurality of servers configured to operate in two or more threshold security planes with each such threshold security plane implementing at least a portion of a corresponding threshold security protocol involving at least a subset of the servers;
 wherein the two or more security planes comprise two or more of an authentication plane, an access control plane and a resource plane;
 wherein at least one server $S_{A,i}$ of the authentication plane applies at least one authentication protocol to determine if a requesting user is authenticated and if the requesting user is authenticated generates an attestation for a user session as $A[s, S_{A,i}]$, where i is an integer identifying a particular one of the authentication plane servers, and s is an identifier of the user session; and
 wherein the servers are implemented on at least one processing device comprising a processor coupled to a memory.

* * * * *

UNITED STATES PATENT AND TRADEMARK OFFICE
CERTIFICATE OF CORRECTION

PATENT NO. : 8,782,752 B1  
APPLICATION NO. : 13/538567  
DATED : July 15, 2014  
INVENTOR(S) : Ari Juels et al.

Page 1 of 1

It is certified that error appears in the above-identified patent and that said Letters Patent is hereby corrected as shown below:

In the Specification:

Column 6, line 48, please change "1={1}" to --l={1}--

Column 7, line 12, please change "i, j and/may" to --i, j and l may--

Signed and Sealed this  
Thirtieth Day of December, 2014

Michelle K. Lee  
*Deputy Director of the United States Patent and Trademark Office*